United States Patent
Caruso et al.

(10) Patent No.: US 9,951,750 B2
(45) Date of Patent: Apr. 24, 2018

(54) ROTOR BLADE WITH INTERIOR SHELF FOR A FLAT PLATE SPAR CAP

(71) Applicant: General Electric Company, Schenectady, NY (US)

(72) Inventors: Christopher Daniel Caruso, Greenville, SC (US); Aaron A. Yarbrough, Greenville, SC (US); Daniel Alan Hynum, Simpsonville, SC (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 313 days.

(21) Appl. No.: 14/813,505

(22) Filed: Jul. 30, 2015

(65) Prior Publication Data

US 2017/0030330 A1    Feb. 2, 2017

(51) Int. Cl.
*F03D 1/06*    (2006.01)

(52) U.S. Cl.
CPC ........... *F03D 1/0675* (2013.01); *F03D 1/065* (2013.01); *Y02E 10/721* (2013.01)

(58) Field of Classification Search
None
See application file for complete search history.

(56) References Cited

U.S. PATENT DOCUMENTS

| | | | |
|---|---|---|---|
| 4,662,587 A * | 5/1987 | Whitener | B29C 70/08 244/117 R |
| 7,625,185 B2 * | 12/2009 | Wobben | B29C 70/86 416/226 |
| 8,353,674 B2 * | 1/2013 | Bech | F03D 1/065 416/230 |
| 8,506,258 B2 | 8/2013 | Baker et al. | |
| 8,540,491 B2 | 9/2013 | Gruhn et al. | |
| 2009/0175731 A1 | 7/2009 | Burchardt et al. | |

(Continued)

FOREIGN PATENT DOCUMENTS

| | | |
|---|---|---|
| DE | 102012219224 B3 | 3/2014 |
| EP | 2113373 B1 | 1/2011 |

(Continued)

OTHER PUBLICATIONS

European Search Report and Opinion issued in connection with corresponding EP Application No. 16180553.6 dated Dec. 20, 2016.

*Primary Examiner* — Woody Lee, Jr.
*Assistant Examiner* — Theodore Ribadeneyra
(74) *Attorney, Agent, or Firm* — Dority & Manning, P.A.

(57) ABSTRACT

A rotor blade may generally include a shell forming an outer skin of the blade, with the shell defining a chordwise curvature. The rotor blade may also include a spar cap extending within the shell along a spanwise direction of the blade. The spar cap may be formed from an assembly of pre-cured laminate plates. In addition, the rotor blade may include an interior shelf positioned directly between the shell and the spar cap. The interior shelf may include an outer surface extending adjacent to the shell and an inner surface opposite the outer surface. The outer surface may define a curved profile generally corresponding to a portion of the chordwise curvature of the shell and the inner surface may define a planar surface along which the spar cap extends in a chordwise direction of the blade. The interior shelf may correspond to a pre-fabricated insert for the blade.

17 Claims, 15 Drawing Sheets

(56) References Cited

U.S. PATENT DOCUMENTS

| | | |
|---|---|---|
| 2009/0226702 A1 | 9/2009 | Madsen et al. |
| 2010/0135818 A1 | 6/2010 | Babu et al. |
| 2012/0039720 A1 | 2/2012 | Bech |
| 2013/0115095 A1* | 5/2013 | Nielsen ................ F03D 1/0675 416/233 |
| 2013/0333823 A1 | 12/2013 | Hedges et al. |
| 2014/0003956 A1 | 1/2014 | Lull et al. |
| 2014/0234114 A1* | 8/2014 | Schibsbye ............ F03D 1/0675 416/226 |
| 2014/0322025 A1* | 10/2014 | Barnhart ................ F01D 5/147 416/241 R |

FOREIGN PATENT DOCUMENTS

| | | | |
|---|---|---|---|
| EP | 2778393 A2 * | 9/2014 | ........... F03D 1/0633 |
| WO | 2014044280 A1 | 3/2014 | |
| WO | WO 2014/049354 A1 | 4/2014 | |
| WO | 2014063783 A1 | 5/2014 | |
| WO | 2014063944 A1 | 5/2014 | |

* cited by examiner

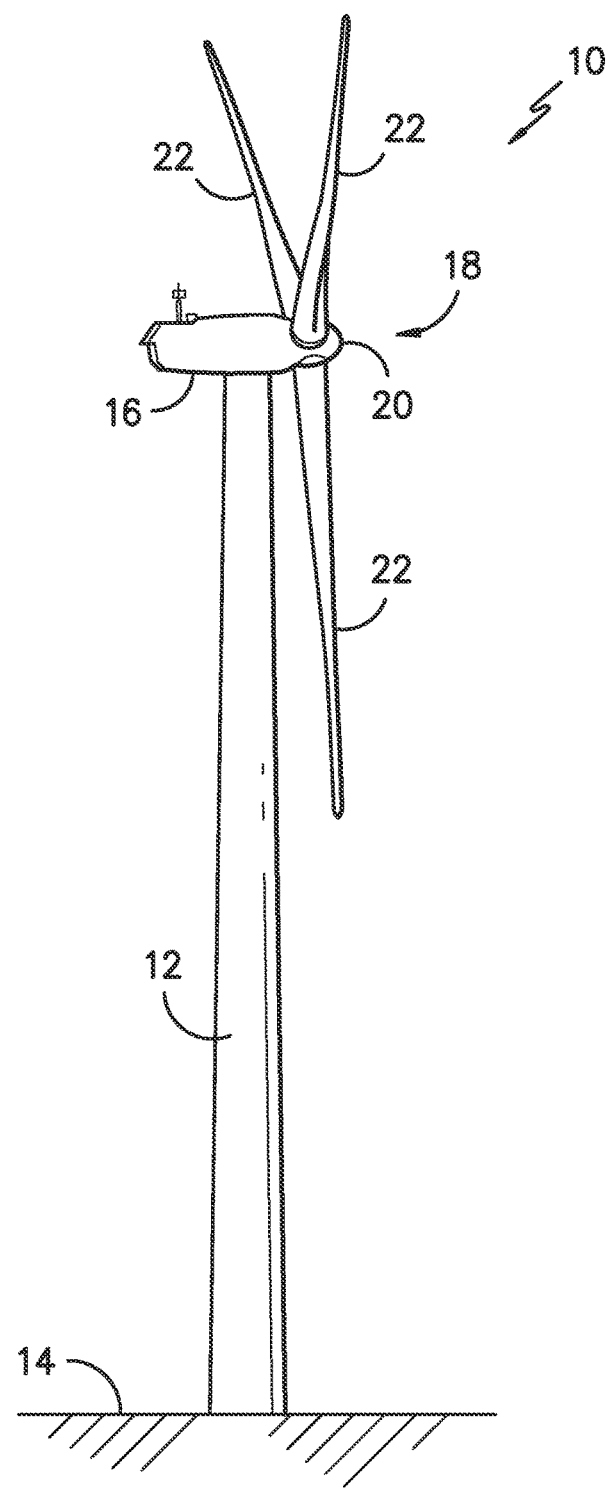
FIG. -1-

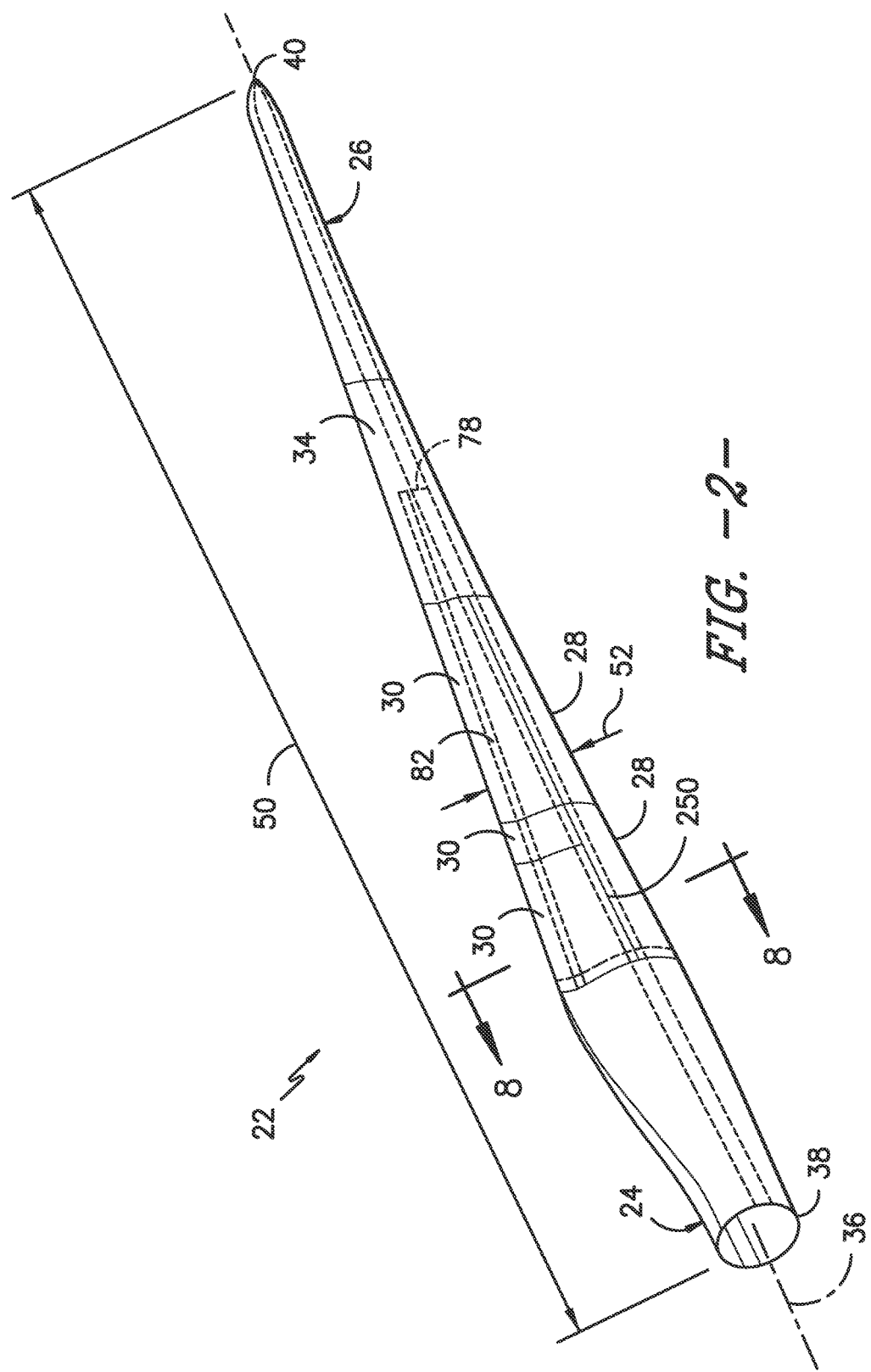

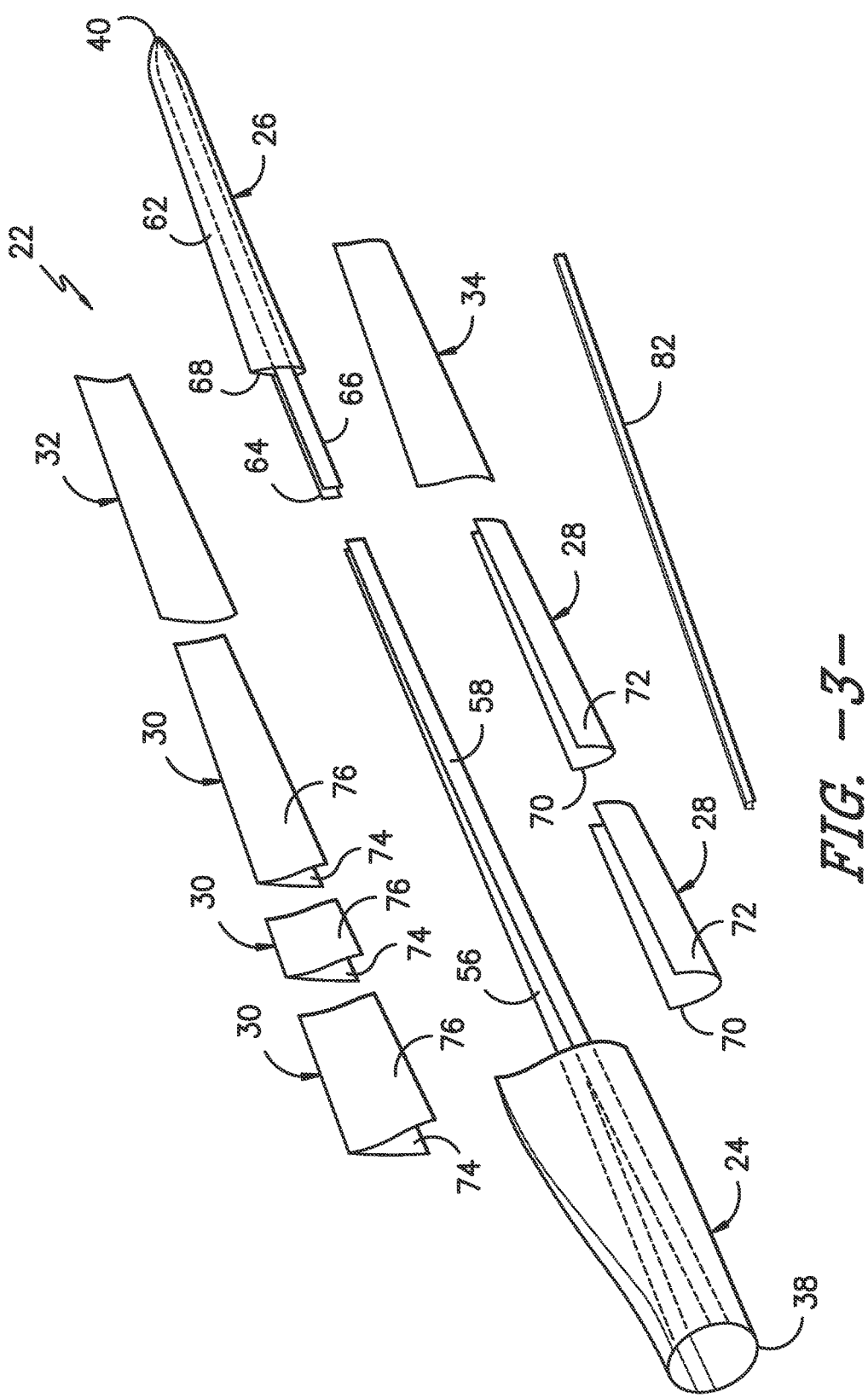
FIG. -3-

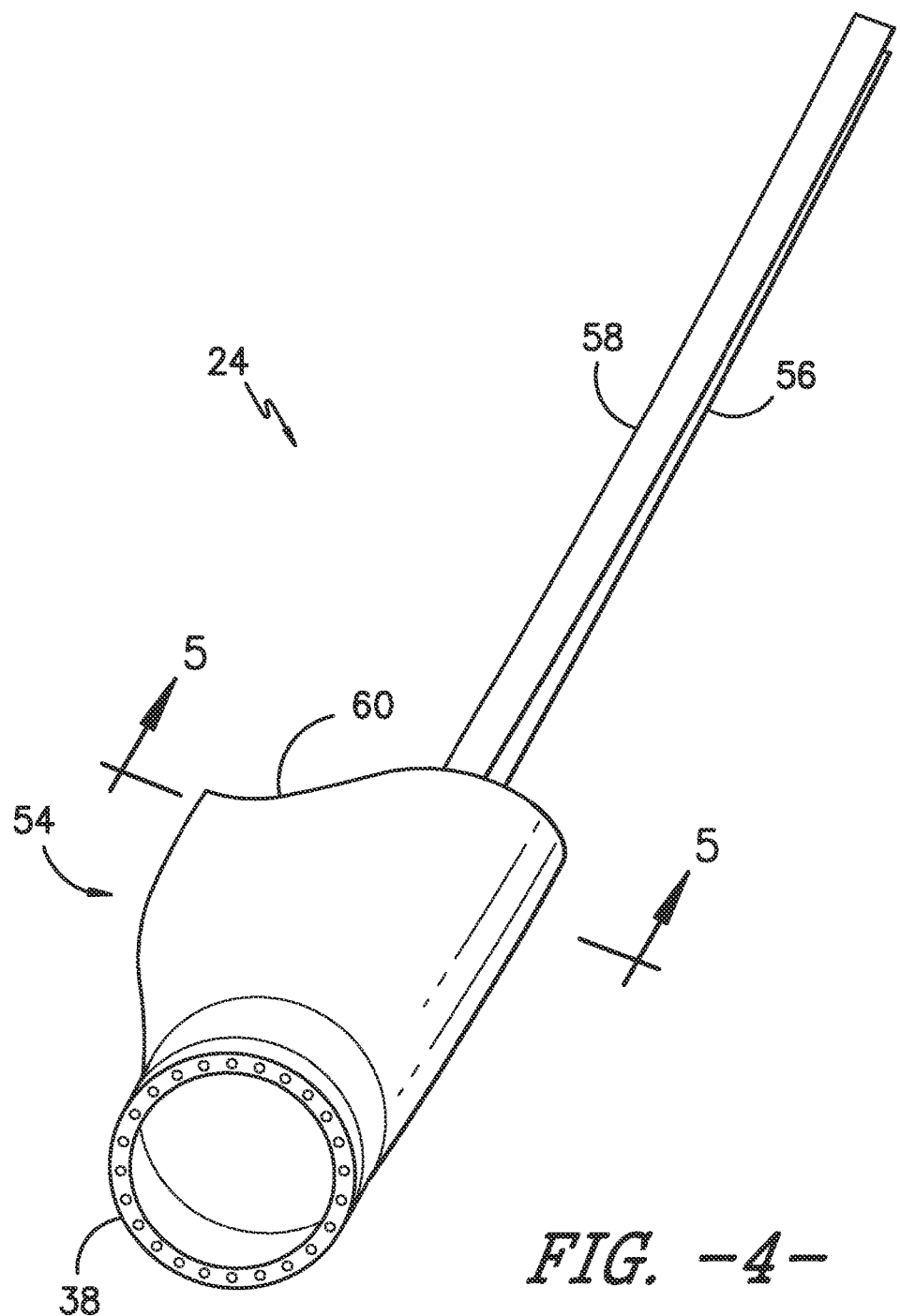
FIG. -4-

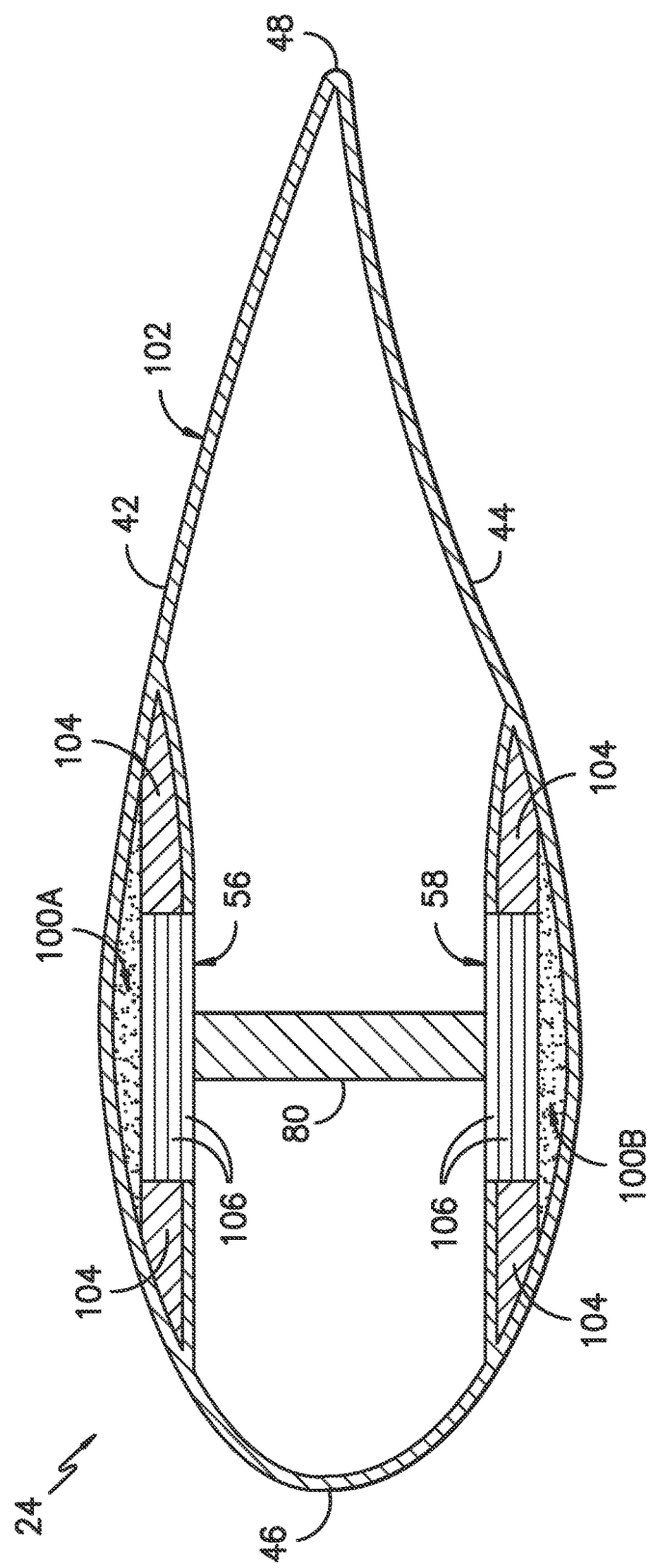
FIG. -5-

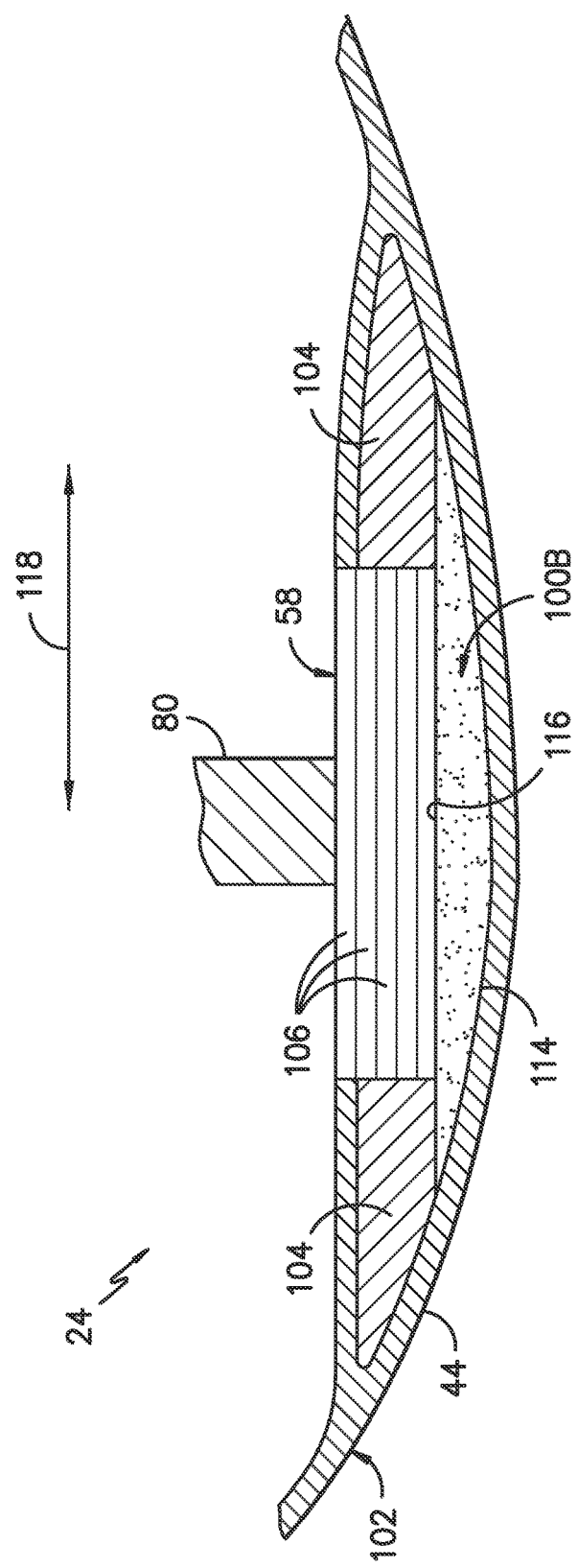

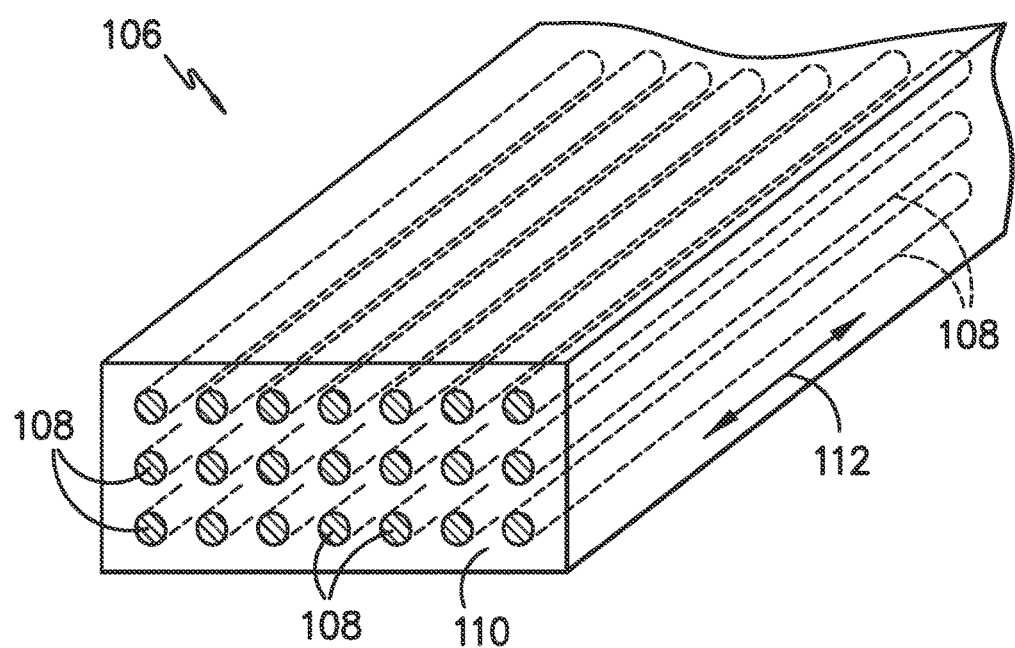
FIG. -7-

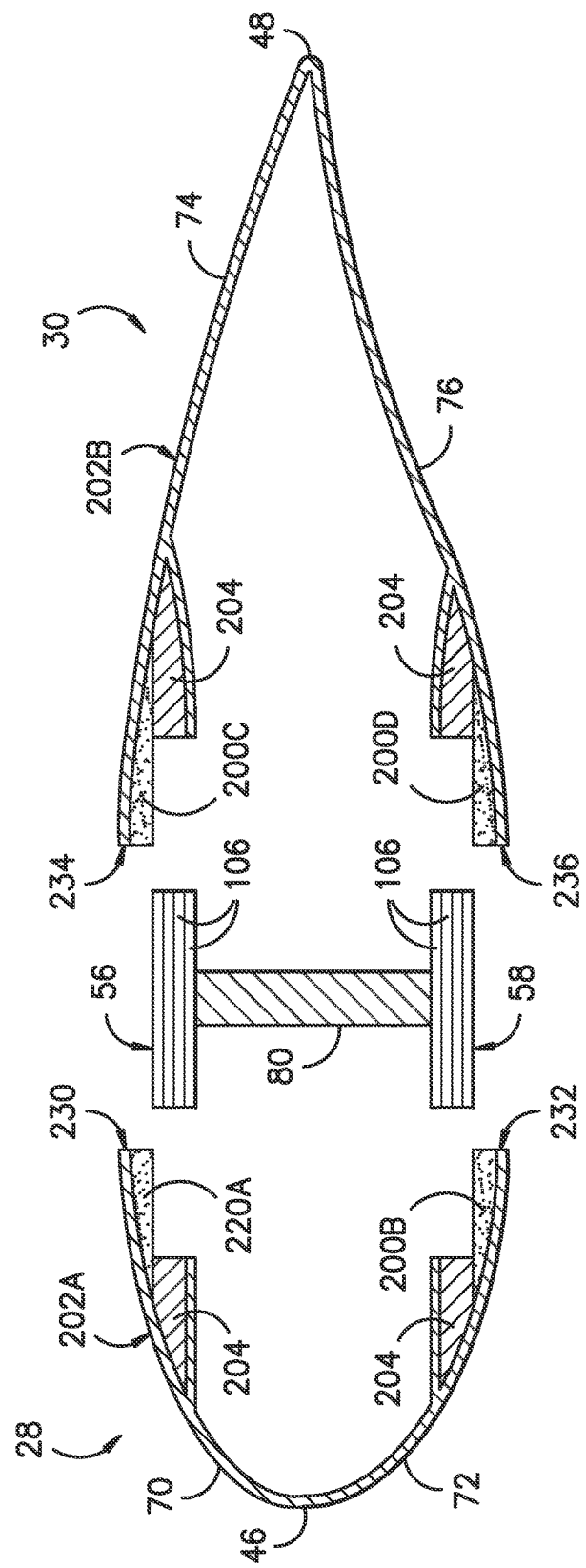
FIG. -8-

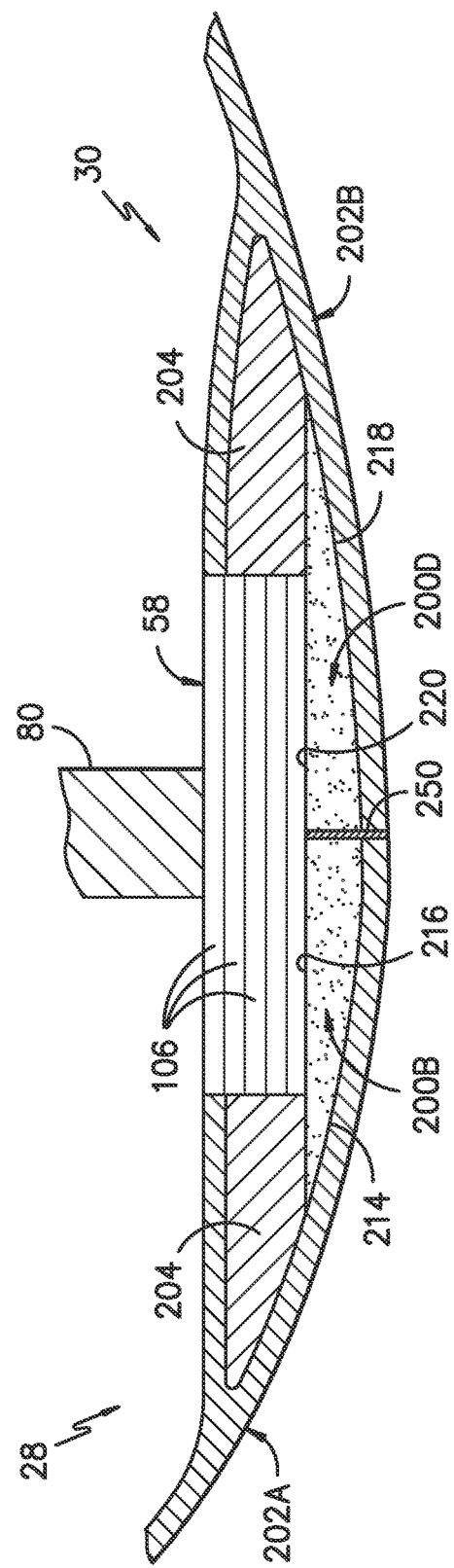

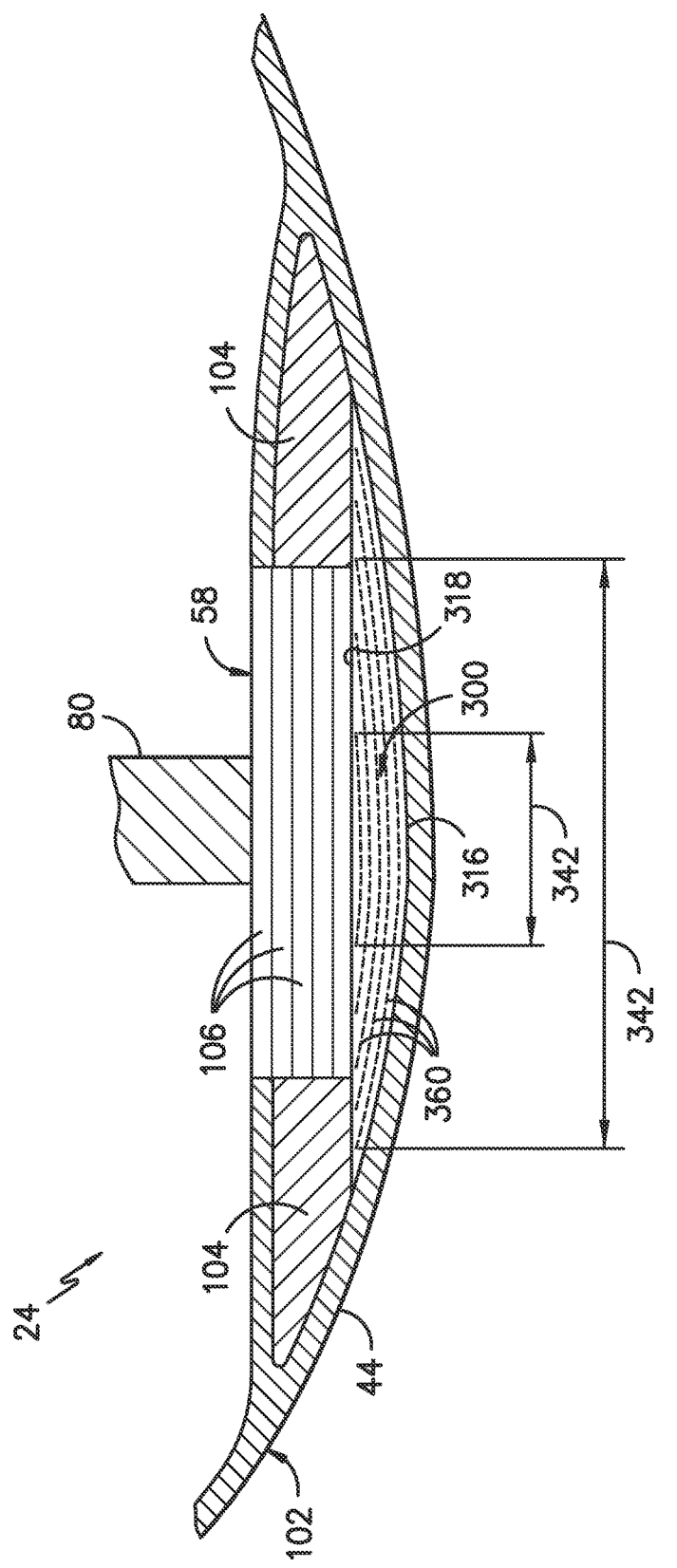

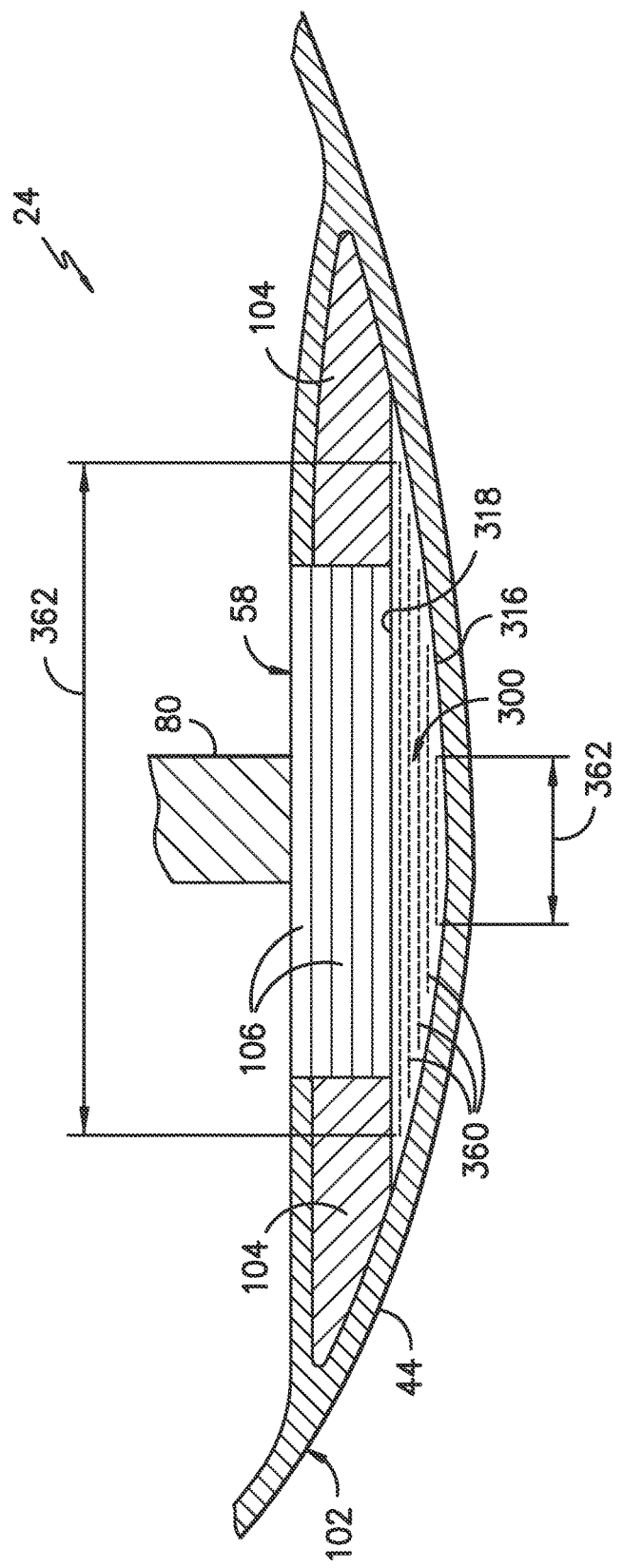

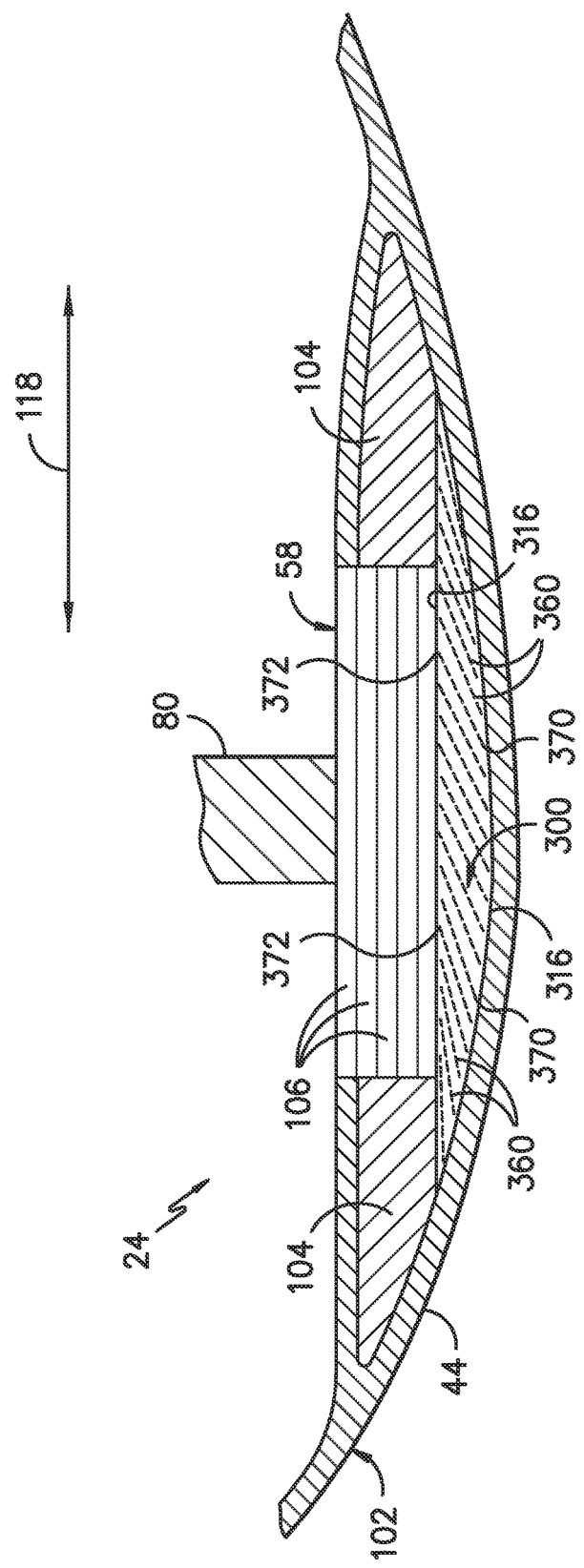
FIG. -12-

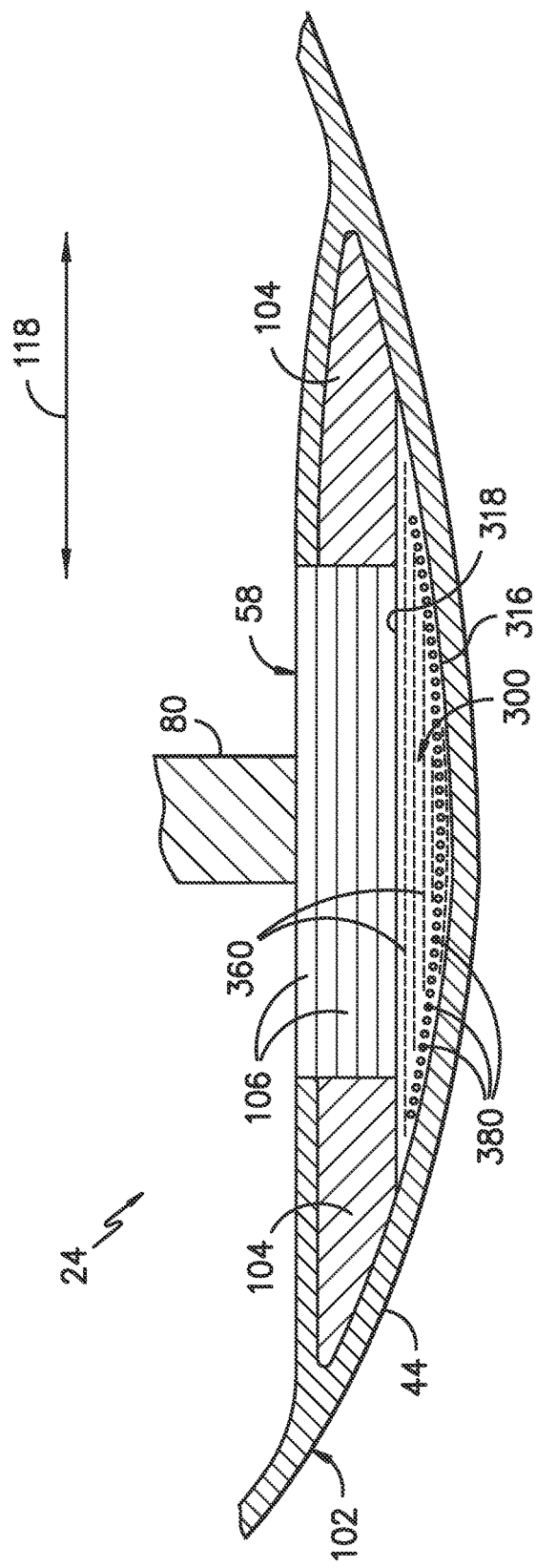
FIG. -13-

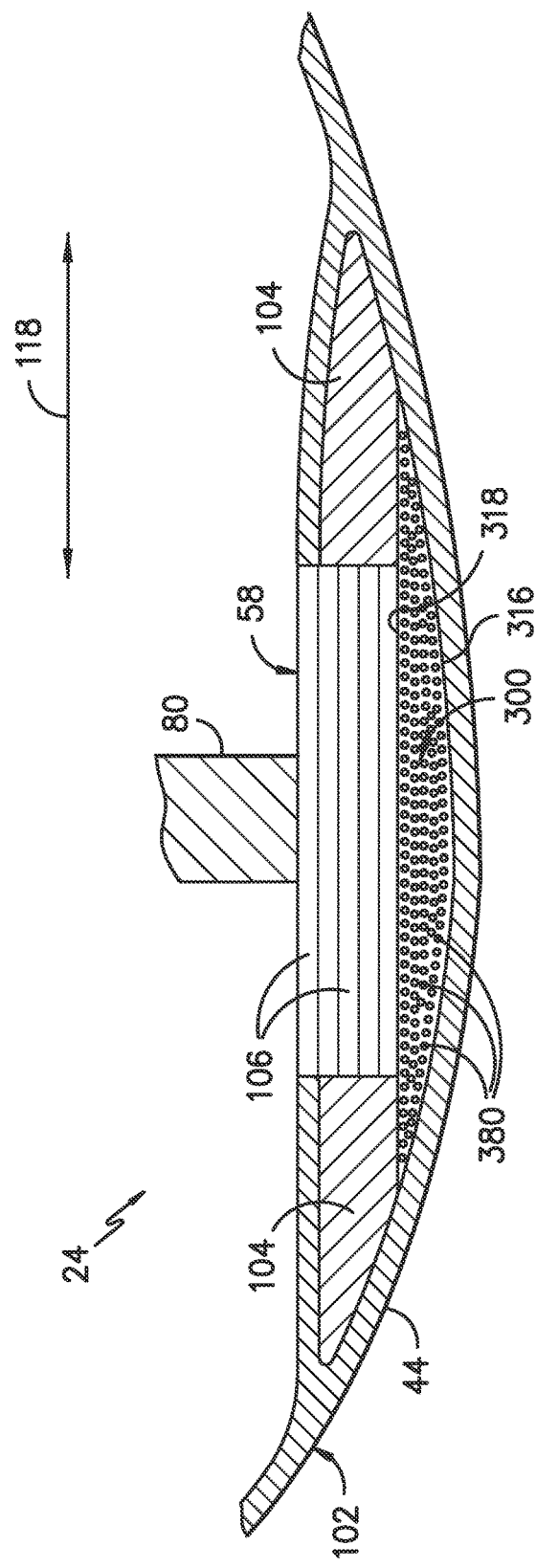
FIG. -14-

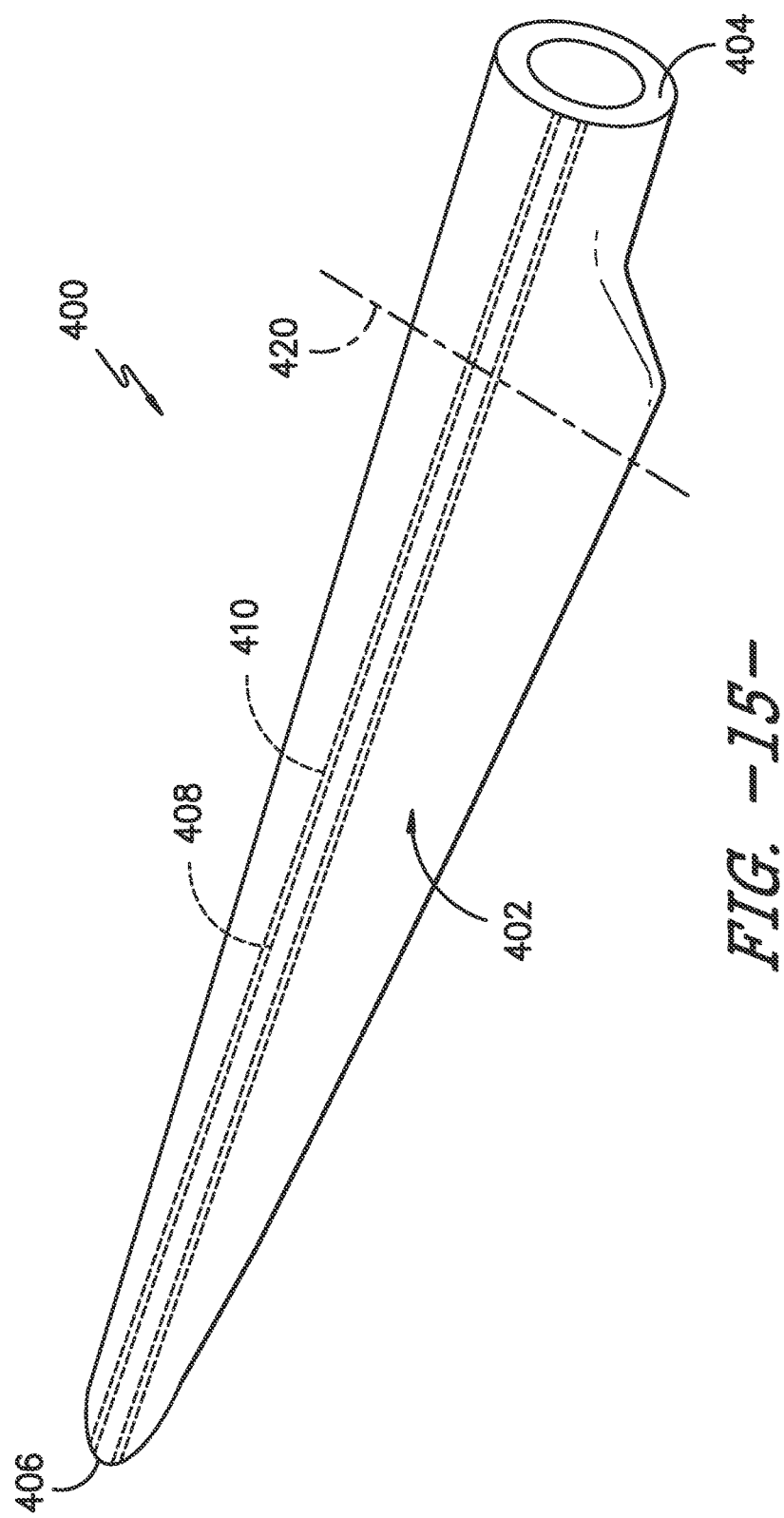
FIG. -15-

ROTOR BLADE WITH INTERIOR SHELF FOR A FLAT PLATE SPAR CAP

FIELD OF THE INVENTION

The present subject matter relates generally to wind turbines and, more particularly, to a rotor blade including both a spar cap formed from pre-cured laminate plates and an interior shelf that is configured to be placed adjacent to an outer skin or shell of the rotor blade so as to provide a flat or planar surface for assembling the pre-cured laminate plates on top thereof.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbine rotor blades typically include an outer body skin or shell formed from a composite laminate material. In general, the body shell is relatively lightweight and has structural properties (e.g., stiffness, buckling resistance and strength) which are not configured to withstand the bending moments and other loads exerted on the rotor blade during operation. In addition, wind turbine blades are becoming increasingly longer in order to produce more power. As a result, the blades must be stiffer and thus heavier so as to mitigate loads on the rotor.

To increase the stiffness, buckling resistance and strength of the rotor blade, the body shell is typically reinforced using one or more structural components (e.g. opposing spar caps with a shear web configured therebetween) that engage the inner surfaces of the shell. The spar caps are typically constructed from laminate composites (e.g., glass fiber laminate composites and/or carbon fiber laminate composites) that include dry or non-cured fabric plies that are laid up within the blade mold and subsequently infused with resin. Such materials, however, can be difficult to control during the manufacturing process and/or are often defect prone and/or highly labor intensive due to handling of the non-cured fabrics and the challenges of infusing large laminated structures.

As such, recent attempts have been made to form spar caps from pre-fabricated, pre-cured laminate composites that can be produced in thicker sections, and are typically less susceptible to defects. However, the use of these thicker, pre-cured laminates also presents unique challenges during the blade manufacturing process. For example, the thicker pre-cured laminates present challenges with respect to conforming the individual laminate plies or plates to the desired curvature of the blade due to the stiffness of such plates.

Accordingly, a rotor blade with features that allow pre-fabricated, pre-cured laminate composite plates to be used to form the blade's spar caps without requiring such plates to conform to the chordwise curvature of the rotor blade would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a rotor blade for a wind turbine. The rotor blade may generally include a shell forming an outer skin of the rotor blade, with the shell defining a chordwise curvature. The rotor blade may also include a spar cap extending within the shell along a spanwise direction of the rotor blade. The spar cap may be formed from an assembly of pre-cured laminate plates. In addition, the rotor blade may include an interior shelf positioned directly between the shell and the spar cap. The interior shelf may include an outer surface extending adjacent to the shell and an inner surface opposite the outer surface. The outer surface may define a curved profile generally corresponding to a portion of the chordwise curvature of the shell and the inner surface may define a planar surface along which the spar cap extends in a chordwise direction of the rotor blade. The interior shelf may correspond to a pre-fabricated insert for the rotor blade.

In another aspect, the present subject matter is directed to a rotor blade for a wind turbine. The rotor blade may generally include a shell forming an outer skin of the rotor blade, with the shell defining a chordwise curvature. The rotor blade may also include a spar cap extending within the shell along a spanwise direction of the rotor blade. The spar cap may be formed from an assembly of pre-cured laminate plates. In addition, the rotor blade may include an interior shelf positioned directly between the shell and the spar cap. The interior shelf may include an outer surface extending adjacent to the shell and an inner surface opposite the outer surface. The outer surface may define a curved profile generally corresponding to a portion of the chordwise curvature of the shell and the inner surface may define a planar surface along which the spar cap extends in a chordwise direction of the rotor blade. The interior shelf may be formed from a plurality of fabric plies, with the fabric plies defining varying widths along the chordwise direction of the rotor blade.

In a further aspect, the present subject matter is directed to a rotor blade for a wind turbine. The rotor blade may generally include a shell forming an outer skin of the rotor blade, with the shell defining a chordwise curvature. The rotor blade may also include a spar cap extending within the shell along a spanwise direction of the rotor blade. The spar cap may be formed from an assembly of pre-cured laminate plates. In addition, the rotor blade may include an interior shelf positioned directly between the shell and the spar cap. The interior shelf may include an outer surface extending adjacent to the shell and an inner surface opposite the outer surface. The outer surface may define a curved profile generally corresponding to a portion of the chordwise curvature of the shell and the inner surface may define a planar surface along which the spar cap extends in a chordwise direction of the rotor blade. The interior shelf may be formed from a plurality of fabric plies, with the fabric plies being provided in a staggered arrangement along the chordwise direction of the rotor blade.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a side view of one embodiment of a wind turbine in accordance with aspects of the present subject matter;

FIG. 2 illustrates a perspective, assembled view of one embodiment of a modular rotor blade in accordance with aspects of the present subject matter;

FIG. 3 illustrates a perspective, exploded view of the modular rotor blade shown in FIG. 2;

FIG. 4 illustrates a perspective view of a blade root section of the modular rotor blade shown in FIGS. 2 and 3;

FIG. 5 illustrates a cross-sectional view of the blade root section shown in FIG. 4 taken about line 5-5, particularly illustrating the blade root section including an outer shell, opposed spar caps formed from pre-cured laminate plates and an interior shelf positioned between the outer shell and each spar cap;

FIG. 6 illustrates an enlarged portion of the cross-sectional view of the blade root section shown in FIG. 5;

FIG. 7 illustrates a perspective view of a portion of one of the pre-cured laminate plates shown in FIGS. 5 and 6;

FIG. 8 illustrates a cross-sectional view of two of the leading edge and trailing edge segments of the modular rotor blade shown in FIGS. 2 and 3, particularly illustrating each edge segment being exploded away from the blade's spar caps and shear web and including an interior shelf configured to be positioned adjacent to one of the spar caps;

FIG. 9 illustrates a close-up, cross-sectional view of a portion of the components shown in FIG. 8 after such components have been assembled together;

FIG. 10 illustrates an enlarged, partial cross-sectional view of the blade root section shown in FIG. 5 that is similar to the cross-sectional view shown in FIG. 6, particularly illustrating another embodiment of an interior shelf that may be positioned between the outer shell and each spar cap;

FIG. 11 illustrates a cross-sectional view of an alternative embodiment of the interior shelf shown in FIG. 10;

FIG. 12 illustrates an enlarged, partial cross-sectional view of the blade root section shown in FIG. 5 that is similar to the cross-sectional view shown in FIG. 6, particularly illustrating a further embodiment of an interior shelf that may be positioned between the outer shell and each spar cap;

FIG. 13 illustrates an enlarged, partial cross-sectional view of the blade root section shown in FIG. 5 that is similar to the cross-sectional view shown in FIG. 6, particularly illustrating yet another embodiment of an interior shelf that may be positioned between the outer shell and each spar cap;

FIG. 14 illustrates an enlarged, partial cross-sectional view of the blade root section shown in FIG. 5 that is similar to the cross-sectional view shown in FIG. 6, particularly illustrating an even further embodiment of an interior shelf that may be positioned between the outer shell and each spar cap; and FIG. 15 illustrates a perspective view of one embodiment of a non-modular rotor blade in accordance with aspects of the present subject matter, particularly illustrating the rotor blade including an outer shell, opposed spar caps and an interior shelf positioned between the outer shell and each spar cap.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a rotor blade including opposed spar caps formed from pre-cured laminate plates and an interior shelf configured to be positioned between an outer shell of the rotor blade and each spar cap. Specifically, in several embodiments, the interior shelf may include an outer surface configured to conform to the chordwise curvature defined by the outer shell of the rotor blade and an inner surface defining a flat platform or shelf. Thus, the pre-cured laminate plates may be stacked one on top of the other directly onto the flat inner surface of the interior shelf without requiring the plates to conform to the curvature of the rotor blade or to conform to any other curved surface. As such, thicker plates may be used to form the spar cap, thereby reducing the material and labor costs associated with manufacturing the spar cap.

In several embodiments, the interior shelf may correspond to a pre-fabricated component or insert that is configured to be installed relative to the outer shell of the rotor blade during the blade manufacturing process. For instance, in a particular embodiment, the interior shelf may be formed from a low-density material, such as a low-density foam material, and may be shaped specifically to fit within the blade component(s) being manufactured. In other embodiments, the interior shelf may be configured to be built-up or otherwise formed within or in connection within the outer shell of the rotor blade. For instance, in one embodiment, the interior shelf may be formed from a plurality of fabric plies that are assembled within the outer shell of the rotor blade.

It should be appreciated that, in several embodiments, the pre-cured laminate plates of the present subject matter may correspond to pultruded plates. As is generally understood, "pultruded composites" or "pultrusions" generally encompass reinforced materials (e.g. fibers or woven or braided strands) that are impregnated with a resin and pulled through a heated stationary die such that the resin cures or undergoes polymerization. As such, the process of manufacturing pultruded composites is typically characterized by a continuous process of composite materials that produces composite parts having a constant cross-section (e.g., a rectangular cross-section). However, in other embodiments, the pre-cured laminate plates described herein may be formed using any other suitable process, such as a belt-pressing manufacturing process.

Referring now to the drawings, FIG. 1 illustrates a side view of one embodiment of a wind turbine 10. As shown, the wind turbine 10 generally includes a tower 12 extending from a support surface 14 (e.g., the ground, a concrete pad or any other suitable support surface). In addition, the wind turbine 10 may also include a nacelle 16 mounted on the tower 12 and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Referring now to FIGS. 2-5, several views of a modular rotor blade 22 and/or components of a modular rotor blade 22 that may be utilized with the wind turbine 10 shown in FIG. 1 are illustrated in accordance with aspects of the present subject matter. Specifically, FIG. 2 illustrates an assembled, perspective view of the modular rotor blade 22 and FIG. 3 illustrates an exploded view of the rotor blade 22 shown in FIG. 2. FIG. 4 illustrates a perspective view of a blade root section 24 of the modular rotor blade 22 shown in FIGS. 2 and 3. Additionally, FIG. 5 illustrates a cross-sectional view of the blade root section 24 shown in FIG. 4 taken about line 5-5.

As shown, the rotor blade 22 has a modular configuration including a plurality of blade sections 24, 26, 28, 30, 32, 34 configured to be coupled together to form a complete rotor blade. For instance, in the illustrated embodiment, the rotor blade 22 includes a pre-formed blade root section 24, a pre-formed blade tip section 26 disposed opposite the blade root section 24 and a plurality of intermediate blade segments 28, 30, 32, 34 configured to be arranged between the blade root section 24 and the blade tip section 26 along a longitudinal axis 36 of the rotor blade. The blade root section 24 may generally be configured to define or form a blade root or root end 38 for coupling the rotor blade 22 to the hub 20 (FIG. 1) of the wind turbine 10. Similarly, the tip section 26 may generally define a blade tip or tip end 40 corresponding to the outermost portion of the rotor blade 22 along its longitudinal axis 36.

When assembled, the rotor blade 22 may generally define a substantially aerodynamic profile, such as by defining a symmetrical or cambered airfoil-shaped cross-section. For instance, as shown in FIG. 5, the rotor blade 22 may define a pressure side 42 and a suction side 44 extending between leading and trailing edges 46, 48. Additionally, as particularly shown in FIG. 2, the assembled rotor blade 22 may generally have a span 50 defining the total length between the root end 38 and the tip end 40 of the blade 22 and a chord 52 defining the total length between the leading edge 46 and the trailing edge 48 of the blade 22. As is generally understood, the chord 52 may generally vary in length with respect to the span 50 as the rotor blade 22 extends from its root end 38 to its tip end 40.

As particularly shown in FIG. 4, the blade root section 24 may generally include a root portion 54 and one or more continuous, longitudinal spar caps 56, 58 co-infused with the root portion 54, with the spar cap(s) 56, 58 generally extending outwardly from the root portion 54 in the spanwise direction of the rotor blade 22. The root portion 54 may extend lengthwise between the root end 38 of the blade root section 24 and an outboard end 60. As shown in FIG. 4, the root end 38 may generally define a substantially circular cross-section that transitions into an airfoil-shaped cross-section as the root portion 54 approaches its outboard end 60. As such, the substantially circular cross-section of the root end 38 may allow for the rotor blade 22 to be mounted to the hub 20 of the wind turbine 10. Additionally, in several embodiments, the outboard end 60 of the root portion 54 may define the maximum chord for the rotor blade 22.

Similarly, as shown in FIG. 3, the blade tip section 26 may generally include a tip portion 62 and one or more continuous, longitudinal spar caps 64, 66 co-infused with the tip portion 62, with the spar cap(s) 64, 66 generally extending outwardly from the tip portion 62 in the spanwise direction of the rotor blade 22. The tip portion 62 may extend lengthwise between an inboard end 68 and the tip end 40 of the blade tip section 26.

As indicated above, the rotor blade 22 may also include a plurality of intermediate blade segments 28, 30, 32, 34, 36 configured to be positioned between the root and tip sections 24, 26. For example, as particularly shown in FIG. 3, the rotor blade 22 may include a plurality of leading edge segments 28 and a plurality of trailing edge segments 30 configured to be assembled between the blade root section 24 and the blade tip section 26 along the longitudinal axis 36 of the rotor blade 22. In such an embodiment, each leading edge segment 28 may be configured to define a spanwise section of the leading edge 46 of the rotor blade 22 and may include first and second side sections 70, 72 extending from the leading edge 46 so as to form portions of the pressure and suction sides 42, 44 of the rotor blade 22, respectively. Similarly, each trailing edge segment 30 may be configured to define a spanwise section of the trailing edge 48 of the rotor blade 22 and may include first and second side sections 74, 76 extending from the trailing edge 48 so as to form portions of the pressure and suction sides 42, 44 of the rotor blade 22, respectively. As such, to assemble the rotor blade 22, the side sections 70, 72 of each leading edge segment 28 may be configured to be coupled to the side sections 74, 76 of a corresponding trailing edge segment 30 to form a spanwise section of the rotor blade 22 that includes complete pressure and suction sides 42, 44 extending between the leading and trailing edges 46, 48 of the blade 22. For instance, as will be described below, the side sections 70, 72, 74, 76 of the leading and trailing edge segments 28, 30 may be coupled together at pressure and suction side seams or joints 250 that overlap the structural components of the rotor blade 22 (e.g., the spar caps 56, 58, 64, 66).

Moreover, as shown in FIG. 3, in addition to the leading and trailing edge segments 28, 30, the rotor blade 22 may, in certain embodiments, also include at least one pressure side segment 32 and/or at least one suction side segment 34. In such embodiments, the pressure side segment(s) 32 may generally correspond to a spanwise section of the rotor blade 22 that extends between the leading and trailing edges 46, 48 so as to define the pressure side 42 of the blade 22. Similarly, the suction side segment(s) 34 may generally correspond to a spanwise section of the rotor blade 22 that extends between the leading and trailing edges 46, 48 so as to define the suction side 44 of the blade 22. As such, to assemble the rotor blade 22, each pressure side segment 32 may be coupled to a corresponding suction side segment 34 at the leading and trailing edges 46, 48 of the rotor blade 22.

Referring still to FIGS. 2-5, the rotor blade 22 may also include one or more structural components configured to provide increased stiffness, buckling resistance and/or strength to the rotor blade 22. For example, as indicated above, the blade root section 24 may include opposed longitudinally extending spar caps 56, 58 that are configured to extend outwardly from root portion 54 of the blade root section 24 towards the blade tip section 26 along the spanwise direction of the rotor blade 22. Similarly, the blade tip section 26 may include two opposed, longitudinally extending spar caps 64, 66 configured to extend inwardly from the tip portion 62 of the blade tip section 26 towards the blade root section 24 along the spanwise direction of the rotor blade 22. In such embodiments, the blade root section 24 and the blade tip section 26 may be configured to be joined to one another via their respective spar caps 56, 58, 64, 66. For instance, in several embodiments, outer ends of the blade root spar caps 56, 58 may be configured to be coupled to the inner ends of the blade tip spar caps 64, 66 at a spar cap joint 78 (FIG. 2) so as to couple the blade root section 24 to the blade tip section 26.

It should be appreciated that the rotor blade 22 may also include one or more additional structural components. For instance, as shown in FIG. 5, the rotor blade 22 may include one or more shear webs 80 configured to extend between the opposed blade root spar caps 56, 58 and/or between the opposed blade tip spar caps 64, 66. Additionally, as shown in FIGS. 2 and 3, the rotor blade 22 may also include an auxiliary structural component 82 configured to be coupled to the root portion 54 of the blade root section 24 and extend outwardly therefrom in the spanwise direction of the rotor blade 22 at a location generally adjacent to the trailing edge 48 of the blade 22.

Additionally, it should be appreciated that, in alternative embodiments, the rotor blade 22 may have any other suitable modular configuration, including having any other suitable number and/or configuration of blade sections and/or blade segments. For instance, in one embodiment, the rotor blade 22 may only include leading and trailing edge segments 28, 30 positioned between the blade root and tip sections 24, 26. In another embodiment, the rotor blade 22 may only include pressure and suction side segments 32, 34 positioned between the blade root and tip sections 24, 26.

As will be described below, the various spar caps 56, 58, 64, 66 of the rotor blade 22 may be formed from pre-cured laminate plates, which may present unique challenges when incorporating the spar caps 56, 58, 64, 66 into the blade root section 24 and/or the blade tip section 26 of the rotor blade 22. For instance, it is often difficult to conform the pre-cured laminate plates to the curvature of the rotor blade 22, particularly the significant chordwise curvature of the blade root section 24. To address this issue, the present subject matter is directed to an interior shelf that may be positioned between the outer skin of the rotor blade 22 and each spar cap 56, 58, 64, 66 to provide a flat platform or shelf for assembling the pre-cure laminate plates.

One embodiment of a suitable interior shelf 100 that may be utilized in accordance with aspects of the present subject matter is illustrated in FIGS. 5 and 6. As indicated above, FIG. 5 illustrates a cross-sectional view of the blade root section 24 shown in FIG. 4 taken about line 5-5. Additionally, FIG. 6 illustrates an enlarged portion of the cross-section of the blade root section 24 shown in FIG. 5.

As shown in FIGS. 5 and 6, the blade root section 24 may include an outer shell 102 that generally serves as the outer casing or skin of the blade root section 24. In several embodiments, the outer shell 102 of the blade root section 24 may be formed from a plurality of shell components or sections. For example, in one embodiment, the outer shell 102 may be manufactured from a first shell half generally defining the pressure side 42 of the blade root section 24 and a second shell half generally defining the suction side 44 of the blade root section 24, with such shell halves being secured to one another at the leading and trailing edges 46, 48 of the blade 22. Alternatively, the outer shell 102 may be formed as a single, integral component.

Additionally, the outer shell 102 may generally be formed from any suitable material. For instance, in one embodiment, the outer shell 102 may be formed entirely from a laminate composite material, such as a carbon fiber reinforced laminate composite or a glass fiber reinforced laminate composite. Alternatively, one or more portions of the outer shell 102 may be configured as a layered construction and may include a core material, formed from a lightweight material, such as wood (e.g., balsa), disposed between layers of laminate composite material. For instance, as shown in FIGS. 5 and 6, the outer shell 102 may include core material 104 positioned along either side of the opposed spar caps 56, 58 of the blade root section 24.

As indicated above, each spar cap 56, 58 of the blade root section 24 may be formed from a plurality of pre-cured laminate plates 106. Specifically, in several embodiments, the pre-cured laminate plates 106 may be stacked on one top of the other such that each plate forms a single layer of the spar cap 56, 58. The stacked plates 106 may then be joined together using any suitable means, for example, by vacuum infusing the plates 106 together or by bonding the plates 106 together via an adhesive, a semi-preg material, or a pre-preg material, to complete the assembly of the spar cap 56, 58.

In several embodiments, each pre-cured laminate plate 106 may correspond to a pultruded plate. For instance, FIG. 7 illustrates a perspective view of a portion of one of the pre-cured laminate plates 106 shown in FIGS. 5 and 6 when the plate 106 corresponds to a pultruded plate. In such an embodiment, one or more fiber materials 108 (e.g., glass or carbon fibers) may be cured during the manufacturing process to form each individual pultruded plate. For example, the fibers 108 may be impregnated with at least one resin material 110 using any suitable means. In particular embodiments, the resin material 110 may include any suitable resin, including but not limited to polyester, polyurethane, polybutylene terephthalate (PBT), polyethylene terephthalate (PET), vinyl ester, epoxy, or similar. The impregnated fibers 108 may then be pulled through a heated stationary die such that the resin 110 cures or undergoes polymerization to form each plate 106. The individually formed plates 106 may then be assembled or joined together (e.g., via a secondary infusion process or using adhesives) to form the resulting spar cap 56, 58. As particularly shown in FIG. 7, the fibers 108 included within each plate 106 may generally be oriented in a common fiber direction 112. In several embodiments, the fiber direction 1112 may extend parallel to the longitudinal or spanwise direction of the rotor blade 22. As such, the fibers 112 contained within each plate 106 used to form each spar cap 56, 58 may generally extend spanwise along the length of the spar cap 56, 58.

Referring back to FIGS. 5 and 6, in accordance with aspects of the present subject matter, an interior shelf 100 may be positioned between the outer shell 102 of the blade root section 24 and each spar cap 56, 58. Specifically, as shown in FIG. 5, a first interior shelf 100A may be positioned between the outer shell 102 and the spar cap 56 extending along the pressure side 42 of the rotor blade 22. Similarly, a second interior shelf 100B may be positioned between the outer shell 102 and the spar cap 58 extending along the suction side 44 of the rotor blade 22. Each interior shelf 100A, 100B may generally be configured to extend spanwise along the length of the spar cap 56, 58.

As particularly shown in FIG. 6, each interior shelf 100A, 100B may include an outer surface 114 positioned adjacent to and/or contacting the outer shell 102 of the blade root section 24 and an inner surface 116 positioned adjacent to and/or contacting the correspond spar cap 56, 58. In several embodiments, the outer surface 114 of each interior shelf 100A, 100B may be configured to conform to the chordwise curvature of the outer shell 102. For example, as shown in FIG. 6, the outer surface 114 of the interior shelf 100B generally defines a curved profile in the chordwise direction of the rotor blade 22 that generally matches or conforms to the chordwise curvature of the portion of the outer shell 102 extending adjacent to the shelf 100B.

Additionally, the inner surface 116 of each interior shelf 100A, 100B may generally be configured to define a flat or planar surface so as to provide a non-curved platform or shelf for the adjacent spar cap 56, 58. Specifically, as shown in FIG. 6, the inner surface 116 of the interior shelf 100B defines a flat or planar surface generally extending parallel to the chordwise direction (indicated by arrow 118 in FIG. 6) of the rotor blade 22. As such, when assembling each spar cap 56, 58, the pre-cured laminate plates 106 may be stacked on top of the flat inner surface 116 of each interior shelf 100A, 100B to form the overall shape of the spar cap 56, 58 without requiring the plates 106 to conform to the chordwise curvature of the rotor blade 22.

In several embodiments, each interior shelf 100A, 100B may be formed from a low-density material. For instance, suitable low-density materials may include, but are not limited to, low-density foam materials, such as polystyrene foams (e.g., expanded polystyrene foams), polyurethane foams, other foam rubbers/resin-based foams and various other open cell and closed cell foams. Alternatively, the low-density material may comprise other suitable low-density material(s), such as balsa wood, cork and/or the like.

Additionally, in several embodiments, each interior shelf 100A, 100B may correspond to a pre-fabricated insert for the rotor blade 22. For example, each interior shelf 100A, 100B may be formed, machined or otherwise manufactured as a separate component from the remainder of the blade root section 24. In such embodiments, when the blade root section 24 is subsequently being manufactured (e.g., when the pressure side half of the blade root section 24 is being manufactured), each interior shelf 100A, 100B may be positioned within the mold directly on top of the plies used to form the outer shell 102 of the blade root section 24. Once the interior shelf 100A, 100B is positioned within the mold, the pre-cured laminate plates 106 may then be stacked directly onto the inner surface 116 of the shelf 100A, 100B. A subsequent infusion process may then be performed on the various components assembled within the mold to join all of such components together.

It should be appreciated that similar interior shelves may also be utilized within one or more of the other sections or segments of the modular rotor blade 22 to provide a flat platform or shelf to accommodate the rectangular cross-sectional shape of the various spar caps 56, 58, 64, 66 described herein. For instance, the blade tip section 26 of the rotor blade 22 may include interior shelves positioned between its spar caps 64, 66 and the outer shell forming the outer casing or skin of the blade tip section 26. Similarly, an interior shelf(ves) may be utilized within one or more of the intermediate blade segments 28, 30, 32, 34 to provide a flat platform or shelf for accommodating the spar caps 56, 58, 64, 66 extending outwardly from the blade root section 24 and/or the blade tip section 26.

For example, FIGS. 8 and 9 illustrate examples of suitable interior shelves 200A, 200B, 200C, 200D that may be utilized within the leading and trailing edge segments 28, 30 of the modular rotor blade 22 described above with reference to FIGS. 2 and 3. In particular, FIG. 8 illustrates a cross-sectional view of the rotor blade shown 22 in FIG. 2 taken about line 8-8, with the leading and trailing edge segments 28, 30 being exploded away from the spar caps 56, 58 of the blade root section 24. Additionally, FIG. 9 illustrates an assembled cross-sectional view of the components shown in FIG. 8, particularly illustrating a close-up cross-sectional view of portions of the components adjacent to the root spar cap 58 extending adjacent to the suction side 44 or the rotor blade 22.

As indicated above, each leading edge segment 28 may generally include first and second side sections 70, 72 extending from the leading edge 46 of the rotor blade 22 so as to form portions of the pressure and suction sides 42, 44 of the blade 22. In several embodiments, the first and second side sections 70, 72 may generally be formed by an outer shell 202A that serves as the outer casing or skin of the leading edge segment 28. For example, as shown in FIG. 8, the outer shell 202A may generally extend from a first joint end 230 to a second joint end 232, with the outer shell 202A forming the leading edge 46 of the rotor blade 22 at a location between the first and second joint ends 230, 232.

Additionally, as indicated above, each trailing edge segment 30 may generally include first and second side sections 74, 76 extending from the trailing edge 48 of the rotor blade 22 so as to form portions of the pressure and suction sides 42, 44 of the blade 22. In several embodiments, the first and second side sections 74, 76 may generally be formed by an outer shell 202B that serves as the outer casing or skin of the trailing edge segment 30. For example, as shown in FIG. 8, the outer shell 202B may generally extend from a first joint end 234 to a second joint end 236, with the outer shell 202B forming the trailing edge 48 of the rotor blade 22 at a location between the first and second joint ends 234, 236.

It should be appreciated that the outer shells 202A, 202B of the leading and trailing edge segments 28, 30 may generally be formed from any suitable material. For instance, in one embodiment, the shells 202A, 202B may be formed entirely from a laminate composite material, such as a carbon fiber reinforced laminate composite or a glass fiber reinforced laminate composite. Alternatively, one or more portions of the shells 202A, 202B may be configured as a layered construction and may include a core material, formed from a lightweight material such as wood (e.g., balsa) disposed between layers of laminate composite material. For instance, as shown in FIGS. 8 and 9, each shell 202A, 202B may include core material 204 that is configured to be positioned along one side of each of the opposed spar caps 56, 58 of the blade root section 24.

Additionally, as shown in FIGS. 8 and 9, the leading and trailing edge segments 28, 30 may each include interior shelves 200A, 200B, 200C, 200D extending from their joint ends 230, 232, 234, 236 along the interior of the outer shells 202A, 202B, respectively. Specifically, the leading edge segment 28 may include a first interior shelf 200A extending from the first joint end 230 of the leading edge segment 28 along the interior of the outer shell 202A on the pressure side 42 of the rotor blade 22 and a second interior shelf 200B extending from the second joint end 232 of the leading edge segment 28 along the interior of the outer shell 202B on the suction side 44 of the rotor blade 22. As particularly shown in FIG. 9, each of the interior shelves 200A, 200B of the leading edge segment 28 may include an outer surface 214 positioned adjacent to the outer shell 202A and an inner surface 216 opposite the outer surface 214. Similar to the outer shelves 100A, 100B described above, the outer surface 214 of each interior shelf 200A, 200B may generally be configured to conform to the chordwise curvature of the outer shell 202A of the leading edge segment 28 while the inner surface 216 of each interior shelf 200A, 200B may generally define a flat or planar surface for accommodating or supporting the adjacent spar caps 56, 58.

Similarly, as shown in FIGS. 8 and 9, the trailing edge segment 30 may include a first interior shelf 200C extending from the first joint end 234 of the trailing edge segment 30 along the interior of the outer shell 202B on the pressure side 42 of the rotor blade 22 and a second interior shelf 200D extending from the second joint end 236 of the trailing edge segment 30 along the interior of the outer shell 202B on the suction side 44 of the rotor blade 22. As particularly shown in FIG. 9, each of the interior shelves 200C, 200D of the trailing edge segment 30 may include an outer surface 218 positioned adjacent to the outer shell 202B of the trailing edge segment 30 and an inner surface 220 opposite the outer surface 218. Similar to the interior shelves 100A, 100B, 200A, 200B described above, the outer surface 218 of each interior shelf 200C, 200D may generally be configured to conform to the chordwise curvature of the outer shell 202B of the trailing edge segment 30 while the inner surface 220 of each interior shelf 200C, 200D may generally define a flat or planar surface for accommodating or supporting the adjacent spar caps 56, 58.

As particularly shown in FIG. 9, when the joint ends 230, 232, 234, 236 of the leading and trailing edge segments 28, 30 are joined together to form pressure and suction side seams or joints 250 along the pressure and suction sides of the rotor blade 22, the adjacent shelves 200A, 200B, 200C, 200D of the leading and trailing edge segments 28, 30 may be configured to be aligned with one another such that the inner surfaces 216, 220 of the shelves 200A, 200B, 200C, 200D form a substantially continuous, flat or planar surface. As such, the adjacent spar cap 56, 58 may be supported or otherwise positioned directly adjacent to the aligned surfaces 216, 220 of the interior shelves 200A, 200B, 200C, 200D without requiring that the pre-cured laminate plates 106 forming the spar caps 56, 58 conform to the chordwise curvature of the rotor blade 22.

It should be appreciated that, similar to the interior shelves 100A, 100B described above, the interior shelves 200A, 200B, 200C, 200D may be formed from a low-density material, such as a low-density foam material and/or may correspond to a pre-fabricated component. For example, each interior shelf 200A, 200B, 200C, 200D may be formed, machined or otherwise manufactured as a separate component from the remainder of the leading edge segment 28 or trailing edge segment 30 within which it is designed to be installed.

It should also be appreciated that leading and trailing edge segments 28, 30 may be configured to be joined together at the pressure and suction side seams 250 using any suitable means. For example, in one embodiment, the leading and trailing edge segments 28, 30 may be joined using an adhesive(s). In another embodiment, the leading and trailing edge segments 28, 30 may be joined with fabric plies using a wet lay-up process or any other suitable process. As another example, in embodiments in which the leading and trailing edge segments 28, 30 are formed from compatible thermoplastic materials, such segments 28, 30 may be welded together at the pressure and suction side seams 250.

As indicated above, in several embodiments, the disclosed interior shelves may correspond to pre-fabricated components formed from a low-density material(s). In other embodiments, the interior shelves may be configured to be built-up or otherwise formed onto the outer shell of a blade component and/or may be formed from any other suitable materials. For example, FIG. 10 illustrates another embodiment of a suitable interior shelf 300 that may be utilized in accordance with aspects of the present subject matter, particularly illustrating a similar cross-sectional view of the blade root section 24 shown in FIG. 6 with the interior shelf 300 being installed between the outer shell 102 of the blade root section 24 and one of its spar caps 58.

As shown in FIG. 10, as opposed to being formed from a low-density material, the interior shelf 300 is formed from a plurality of fabric plies 360 (e.g., unidirectional glass plies) that have been assembled or stacked onto the interior of the outer shell 102 of the blade root section 24. In the illustrated embodiment, the interior shelf 300 includes five fabric plies 360 assembled one on top of the other between the outer shell 102 and the adjacent spar cap 58. In other embodiments, the interior shelf 300 may include less than five fabric plies or more than five fabric plies.

It should be appreciated that, once the fabric plies 360 are assembled, the various plies 360 may joined together using any suitable process. For instance, in one embodiment, the plies 360 may be joined together using a subsequent infusion process so that any volume defined between the outer shell 102 and the spar cap 58 that is not occupied by one of the fabric plies 360 may be filled with a suitable resin. Alternatively, if the fabric plies 360 may correspond to pre-preg fabric plies, the fabric plies 360 may be cured to join the various plies together.

As shown in FIG. 10, when assembled, the interior shelf 300 may generally define an outer surface 316 positioned adjacent to the outer shell 102 and an inner surface 318 opposite the outer surface 316. Similar to the interior shelves 100A, 100B, 200A, 200B, 200C, 200D described above, the outer surface 316 of the interior shelf 300 may generally be configured to conform to the chordwise curvature of the outer shell 102 while the inner surface 318 of the interior shelf 300 may generally define a flat or planar surface for accommodating or supporting the adjacent spar cap 58.

In several embodiments, to achieve the curved outer surface 316 and the flat inner surface 318 of the interior shelf 300, one or more of the fabric plies 360 may be configured to define a chordwise width 362 that differs from the chordwise widths 362 of the other fabric plies 360. For instance, as shown in FIG. 10, each fabric ply 360 defines a different chordwise width 362, with the chordwise widths 362 generally decreasing as the interior shelf 300 extends inwardly from the outer shell 102 in the direction of the adjacent spar cap 58 such that the fabric ply 360 closest to the outer shell 102 defines the maximum chordwise width 362 and the fabric ply 360 closest to the spar cap 58 defines the minimum chordwise width 362. In another embodiment, as shown in FIG. 11, the chordwise widths 362 of the fabric plies 360 may generally increase as the interior shelf 300 extends inwardly from the outer shell 102 in the direction of the adjacent spar cap 58. In such an embodiment, the fabric ply 360 closest to the outer shell 102 may define the minimum chordwise width 362 and the fabric ply 360 closest to the spar cap 58 may defines the maximum chordwise width 3612.

In a further embodiment, the interior shelf 300 shown in FIGS. 10 and 11 may be formed by stacking fabric plies 360 having the same or differing chordwise widths in an overlapping or staggered arrangement. For instance, FIG. 12 illustrates an embodiment in which the fabric plies 360 are assembled across the interior of the outer shell 102 in a staggered arrangement along the chordwise direction 118 (indicated by arrow in FIG. 12) of the rotor blade 22 so that each fabric ply 360 overlaps one or more adjacent fabric plies 360 of the interior shelf 300 as such fabric ply 360 extends in the chordwise direction. Specifically, as shown in FIG. 11, each fabric ply 360 extends between an inner end 370 positioned adjacent to the inner surface 316 of the interior shelf 300 and an outer end 372 positioned adjacent to the outer surface 318 of the interior shelf 300 such that the inner end 370 of each fabric ply 360 is provided in an overlapped configuration with the fabric ply 360 positioned immediately adjacent thereto in the direction of the outer shell 102 and/or the outer end 372 of each fabric ply 360 is provided in an overlapped configuration with the fabric ply 360 positioned immediately adjacent thereto in the direction of the spar cap 58. Similar to the configuration described above with reference to FIGS. 10 and 11, the arrangement of the plies shown in FIG. 12 may allow the outer surface 316 of the interior shelf 300 to generally conform to the chordwise curvature of the outer shell 102 while the inner surface 318 of the interior shelf 300 may generally define a flat or planar surface for accommodating or supporting the adjacent spar cap 58.

It should be appreciated that, in other embodiments, the fabric plies 360 may be arranged in any other suitable manner and/or may have any other suitable dimensional parameter that allows for an interior shelf to be formed that provides both a curved outer surface that conforms to the chordwise curvature of the rotor blade 22 and a flat inner surface that provides a planar platform or shelf for the adjacent spar cap. For instance, in an alternative embodiment, the thicknesses, lengths and/or widths of the fabric plies 360 may be varied, as necessary, to achieve the desired overall shape for the interior shelf.

Moreover, it should be appreciated that, in further embodiments, the fabric plies 360 may be combined with any other suitable material(s) to form the interior shelf 300. For example, FIG. 13 illustrates an embodiment in which a plurality of fabric plies 360 have been combined with a plurality of fabric tows 380 (i.e., a small cluster or bundle of fibers that are not stitched together and, thus, do not form a ply). Specifically, in several embodiments, the fabric tows 380 may be interspersed around and/or between the fabric plies 360 so as to occupy portions of the volume of the interior shelf 300 not otherwise occupied by the plies 360. Similar to the configurations described above with reference to FIGS. 10-12, the arrangement of the fabric plies 360 and fabric tows 380 may be selected to allow the outer surface 316 of the interior shelf 300 to generally conform to the chordwise curvature of the outer shell 102 while the inner surface 318 of the interior shelf 300 generally define a flat or planar surface for accommodating or supporting the adjacent spar cap 58.

In several embodiments, each fabric tow 380 may include a plurality of unidirectional fibers configured to extend in a direction generally parallel to the spanwise direction of the rotor blade. In such embodiments, the fibers may also be configured to extend generally parallel to the fiber direction 112 (FIG. 7) of the fibers 108 included within each plate 106 forming the adjacent spar cap 58.

In a further alternative embodiment, the interior shelf 300 may be formed substantially from a plurality of fabric tows 380 without including any of the above-described fabric plies 360. For instance, FIG. 14 illustrates an embodiment in which the interior shelf 300 is formed from a plurality of unidirectional fabric tows 380. In such an embodiment, the fabric tows 380 may be joined together with a suitable resin material to form the overall shape of the shelf 300. Similar to the configurations described above with reference to FIGS. 10-13, the arrangement of the fabric tows 380 may be selected to allow the outer surface 316 of the interior shelf 300 to generally conform to the chordwise curvature of the outer shell 102 while the inner surface 318 of the interior shelf 300 generally define a flat or planar surface for accommodating or supporting the adjacent spar cap 58.

Additionally, it should be appreciated that, although the present subject matter has generally been described herein with reference to the use of interior shelves within a modular rotor blade 22 in order to provide a flat surface for supporting or accommodating a rectangular spar cap formed from pre-cured laminate plates, the disclosed interior shelves and spar caps may similarly be included within a conventional (or non-modular) rotor blade. For example, FIG. 15 illustrates a perspective view of a non-modular rotor blade 400. As shown, the rotor blade 400 includes an outer shell 402 extending lengthwise or spanwise between a blade root 404 and an opposite blade tip 406, with the blade root 404 being configured to be coupled to the hub 20 (FIG. 1) of a corresponding wind turbine. Additionally, as indicated by the dashed lines, the rotor blade 22 may include two longitudinally extending spar caps 408 (only of which is shown) that extend spanwise along the pressure and suction sides of the outer shell 402 between the blade root 404 and the blade tip 406. Similar to the spar caps 56, 58, 64, 66 described above, the spar caps 408 may be formed from an assembly of pre-cured laminates plates, such as the plates 106 shown in FIGS. 5-7.

Moreover, as indicated by the phantom lines in FIG. 15, the rotor blade 400 may also include two interior shelves 410 (only one of which is shown), with each interior shelf 410 being positioned between the outer shell 402 and one of the spar caps 408. In such an embodiment, each interior shelf 410 may generally be configured the same as or similar to the interior shelves 100A, 100B, 200A, 200B, 200C, 200D, 300 described above with reference to FIGS. 5-12 so that the interior shelf 300 includes both an outer curved surface configured to conform to the chordwise curvature of the rotor blade 22 and an inner flat surface for supporting or accommodate the adjacent spar cap 408. For example, in one embodiment, the cross-sectional configuration the rotor blade 400 shown in FIG. 15 at a location indicated by reference line 420 may generally be the same as or similar to the cross-sectional configuration of the portion of the rotor blade 22 shown in FIG. 6.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade for a wind turbine, the rotor blade comprising:
    a shell forming an outer skin of the rotor blade, the shell defining a pressure side and a suction side extending between leading and trailing edges of the rotor blade, the shell including a leading edge segment and a trailing edge segment, the leading and trailing edge segments being joined together at pressure and suction side joints defined along the pressure and suction sides of the rotor blade, respectively, the shell defining a chordwise curvature extending adjacent to the locations of the pressure and suction side joints;

a spar cap extending within the shell along a spanwise direction of the rotor blade and being aligned with the pressure and suction side joints between the pressure and suction sides of the rotor blade, the spar cap being formed from an assembly of pre-cured laminate plates; and an interior shelf positioned directly between the shell and the spar cap at the location of one of the pressure side joint or the suction side joint, the interior shelf including an outer surface extending adjacent to the shell and an inner surface opposite the outer surface, the outer surface defining a curved profile generally corresponding to a portion of the chordwise curvature of the shell, the inner surface defining a planar surface along which the spar cap extends in a chordwise direction of the rotor blade, wherein the interior shelf corresponds to a pre-fabricated insert for the rotor blade.

2. The rotor blade of claim 1, wherein the pre-cured laminate plates are stacked one on top of the other directly onto the inner surface of the interior shelf.

3. The rotor blade of claim 1, wherein the interior shelf is formed from a low-density material.

4. The rotor blade of claim 3, wherein the low-density material corresponds to a low-density foam material.

5. The rotor blade of claim 1, wherein the planar surface defined by the inner surface of the interior shelf extends generally parallel to the chordwise direction of the rotor blade.

6. The rotor blade of claim 1, wherein the spar cap defines a rectangular cross-sectional shape.

7. The rotor blade of claim 1, wherein each pre-cured laminate plate forms a single layer of the spar cap.

8. The rotor blade of claim 1, wherein the pre-cured laminate plates correspond to pultruded plates.

9. The rotor blade of claim 1, wherein the interior shelf corresponds to a first interior shelf extending directly between the spar cap and the leading edge segment, further comprising a second interior shaft extending directly between the spar cap and the trailing edge segment.

10. The rotor blade of claim 9, wherein the first and second interior shelves terminate within the rotor blade at the location of the one of the pressure side joint or the suction side joint.

11. The rotor blade of claim 10, wherein a joint is defined between the first and second interior shelves at the location of the one of the pressure side joint or the suction side joint.

12. A rotor blade for a wind turbine, the rotor blade comprising:

a shell forming an outer skin of the rotor blade, the shell defining a pressure side and a suction side extending between leading and trailing edges of the rotor blade, the shell including a leading edge segment and a trailing edge segment, the leading and trailing edge segments being joined together at pressure and suction side joints defined along the pressure and suction sides of the rotor blade, respectively, the shell defining a chordwise curvature extending adjacent to the locations of the pressure and suction side joints;

a spar cap extending within the shell along a spanwise direction of the rotor blade and being aligned with the pressure and suction side joints between the pressure and suction sides of the rotor blade, the spar cap being formed from an assembly of pre-cured laminate plates; and a first interior shelf positioned directly between the leading edge segment and the spar cap, the first interior shelf including a first outer surface extending adjacent to the leading edge segment and a first inner surface opposite the first outer surface, the first outer surface defining a curved profile generally corresponding to a portion of the chordwise curvature of the shell defined by the leading edge segment, the first inner surface defining a first planar surface along which the spar cap extends in a chordwise direction of the rotor blade;

a second interior shelf positioned directly between the trailing edge segment and the spar cap, the second interior shelf including a second outer surface extending adjacent to the trailing edge segment and a second inner surface opposite the second outer surface, the second outer surface defining a curved profile generally corresponding to a portion of the chordwise curvature of the shell defined by the trailing edge segment, the second inner surface defining a second planar surface along which the spar cap extends in the chordwise direction of the rotor blade.

13. The rotor blade of claim 12, wherein the first and second interior shelves terminate within the rotor blade at the location of one of the pressure side joint or the suction side joint.

14. The rotor blade of claim 13, wherein a joint is defined between the first and second interior shelves at the location of the one of the pressure side joint or the suction side joint.

15. The rotor blade of claim 12, wherein the first and second interior shelves correspond to pre-fabricated inserts for the rotor blade.

16. The rotor blade of claim 12, wherein the first and second interior shelves are formed from a low-density material.

17. The rotor blade of claim 12, wherein the first and second planar surfaces are aligned when the leading and trailing edge segments are coupled together at the pressure and suctions side joints such that a substantially continuous planar surface is defined across the first and second interior shelves along which the spar cap extends.

* * * * *